United States Patent
So et al.

(10) Patent No.: US 10,565,916 B2
(45) Date of Patent: Feb. 18, 2020

(54) PROVIDING STREAMING OF VIRTUAL REALITY CONTENTS

(71) Applicant: KT CORPORATION, Gyeonggi-do (KR)

(72) Inventors: Young-Jun So, Seoul (KR); Chan-Hui Kang, Gyeonggi-do (KR); Kang-Tae Kim, Seoul (KR); I-Gil Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 107 days.

(21) Appl. No.: 15/701,393

(22) Filed: Sep. 11, 2017

(65) Prior Publication Data

US 2018/0077209 A1    Mar. 15, 2018

(30) Foreign Application Priority Data

Sep. 9, 2016 (KR) .................. 10-2016-0116083
Oct. 6, 2016 (KR) .................. 10-2016-0129077

(51) Int. Cl.
*G09G 3/20* (2006.01)
*H04L 29/06* (2006.01)
(Continued)

(52) U.S. Cl.
CPC .............. *G09G 3/20* (2013.01); *G06F 3/011* (2013.01); *G06Q 30/02* (2013.01);
(Continued)

(58) Field of Classification Search
CPC .......... G09G 3/20; G06F 3/013; G06F 3/012; G06F 3/04815; H04N 21/43637; H04L 65/60
See application file for complete search history.

(56) References Cited

U.S. PATENT DOCUMENTS

2006/0034530 A1    2/2006  Park
2011/0273466 A1*   11/2011 Imai .................. G09G 3/20
                                                  345/589
(Continued)

FOREIGN PATENT DOCUMENTS

| KR | 10-0700218 B1 | 3/2007 |
| KR | 10-1282955 B1 | 7/2013 |
| KR | 10-1528863 B1 | 6/2015 |

*Primary Examiner* — Kyung H Shin
(74) *Attorney, Agent, or Firm* — IP Legal Services, LLC (57) ABSTRACT

Provided are providing a virtual reality (VR) contents streaming service. For providing the VR contents, a server may be configured to receive a request message for requesting a predetermined VR contents from a user device through a communication network, determine a field of view (FOV) area in each image frame of the predetermined VR contents and a plurality of extended areas adjacent to the FOV area, receive a viewing area switching request from the user device, wherein the viewing area switching request includes information on a viewing area switching direction and a viewing area switching speed, calculate a size of each extended area based on at least one of the viewing area switching direction, the viewing area switching speed, and a location of an object to be displayed in each extended area, redecide a FOV area and a plurality of extended areas based on the calculated size of each extended area, and encode image data of the redecided FOV area and image data of the plurality of redecided extended areas and transmitting the encoded image data to the user device.

10 Claims, 8 Drawing Sheets

(51) Int. Cl.
*G06F 3/01* (2006.01)
*G06Q 30/02* (2012.01)
G06F 7/00 (2006.01)
G06F 17/00 (2019.01)

(52) U.S. Cl.
CPC ............ H04L 65/4084 (2013.01); *G06F 7/00* (2013.01); *G06F 17/00* (2013.01)

(56) References Cited

U.S. PATENT DOCUMENTS

| | | | |
|---|---|---|---|
| 2012/0299962 A1* | 11/2012 | White | G02B 27/017 345/633 |
| 2014/0375683 A1* | 12/2014 | Salter | G06F 3/013 345/633 |
| 2016/0182946 A1* | 6/2016 | Diefenbaugh | H04N 21/43637 345/2.3 |

* cited by examiner

PROVIDING STREAMING OF VIRTUAL REALITY CONTENTS

CROSS REFERENCE TO PRIOR APPLICATIONS

The present application claims priority under 35 U.S.C. § 119 to Korean Patent Application No. 10-2016-0116083 (filed on Sep. 9, 2016), Korean Patent Application No. 10-2016-0129077 (fined on Oct. 6, 2016).

BACKGROUND

The present disclosure relates to a virtual reality (VR) contents streaming service and, particularly, to streaming high quality VR contents by providing image data of extended areas adjacent to a field of view (FOV) area in each image frame of the VR contents.

Virtual Reality (VR) is a technology for proving a virtual space to a user using three-dimensional (3-D) graphics, sounds and other sensations that simulate a user's physical presence in a virtual or imaginary environment and enabling the user to experience the provided virtual environment. Lately, various virtual reality (VR) devices have been introduced. The most popular VR device may be a head mounted display (HMD). In general, a VR contents streaming server may stream VR contents to such a HMD in response to a request from the HMD, and the HMD displays consecutive image frames of a field of view (FOV) area by processing the streamed VR contents. Such VR contents include a huge amount of digital data for reproducing a three-dimensional (3D) virtual space including objects in such a 3D virtual space. In particular, the VR streaming server determines a FOV area in each image frame, encodes image data of the FOV area, and transmits the encoded image data to the HMD.

When a user wearing the HMD turns a head to see other objects located outside of a FOV area (e.g., changing or switching a FOV area) by turning a head, it is necessary to request the server to redefine a new FOV area and provide image data thereof based on the changed FOV area. Accordingly, a large latency might be generated to obtain the image data of the changed FOV, and such a large latency cause motion sickness of the user.

SUMMARY

In accordance with at least one aspect of the present embodiment, a server may define a plurality of extended areas adjacent to a field of view (FOV) area in each image frame of virtual reality (VR) contents and transmit image data of the plurality of extended areas to a user device.

In accordance with another aspect of the present embodiment, a server may independently and separately encode i) FOV image data of a FOV area in each image frame of VR contents and ii) extended image data of at least one of a plurality of extended areas adjacent to the FOV area, and transmit the encoded FOV image data and the encoded extended image data to a user device.

In accordance with still another aspect of the present embodiment, a user device may receive i) encoded FOV image data of a FOV area in each image frame of VR contents and ii) encoded extended image data of a plurality of extended areas, which are independently and separately encoded by a server, and selectively decode the received FOV image data and the received extended image data.

In accordance with yet another aspect of the present embodiment, a server may receive a viewing area switching request from a user device, redefine a FOV area and a plurality of extended areas according to information included in the viewing area switching request.

In accordance with yet another aspect of the present embodiment, a server may dynamically determine a size of each extended area based on at least one of a viewing area switching direction, a viewing area switching speed, and objects to be included in each extended areas.

In accordance with at least one aspect of the present embodiment, server may receive a request of VR contents from a user device, determine i) a viewing area in VR contents and ii) a plurality of expanded areas adjacent to the viewing area in respect to a viewing area and encode the view area and the plurality of expanded areas, transmit the encoded area to the user device. Further, the server may re-determine a viewing area and a plurality of expanded areas based on a viewing switching direction and a viewing switching speed received from the user device, encode the re-determined viewing area and expended areas, and transmit the encoded viewing area and expended areas to the user device.

In accordance with an embodiment, a method may be provided for providing, by a server, a virtual reality (VR) contents streaming service. The method may include receiving a request message for requesting a predetermined VR contents from a user device through a communication network, determining a field of view (FOV) area in each image frame of the predetermined VR contents and a plurality of extended areas adjacent to the FOV area, receiving a viewing area switching request from the user device, wherein the viewing area switching request includes information on a viewing area switching direction and a viewing area switching speed, calculate a size of each extended area based on at least one of the viewing area switching direction, the viewing area switching speed, and a location of an object to be displayed in each extended area, redeciding a FOV area and a plurality of extended areas based on the calculated size of each extended area, and encoding image data of the redecided FOV area and image data of the plurality of redecided extended areas and transmitting the encoded image data to the user device.

The plurality of extended areas may include a first extended area adjacent to a top of the FOV area, a second extended area adjacent to a bottom of the FOV area, a third extended area adjacent to a right side of the FOV area, and a fourth extended area adjacent to a left side of the FOV area.

The calculating may include enlarging a size of an extended area corresponding to the viewing area switching direction to be larger than sizes of the other extended areas among the plurality of extended areas.

The calculating may further include deciding a size of an extended area corresponding to the viewing area switching direction based on the viewing area switching speed.

The calculating may further include: calculating a distance between the FOV area and an object to be outputted in each extended area; and deciding a size of each extended area based on the calculated distance.

The deciding the size of each extended area may include expanding a size of each extended area to include all objects when each extended area includes the objects more than a predetermined ratio.

In accordance with another embodiment, an apparatus may be provided for providing a virtual reality (VR) contents streaming service. The apparatus may include a communication circuit, a memory, and at least one processor, wherein the at least one processor is configured to: receive a request message for requesting a predetermined VR contents from a user device through a communication network; determine a field of view (FOV) area in each image frame of the predetermined VR contents and a plurality of extended areas adjacent to the FOV area; receive a viewing area switching request from the user device, wherein the viewing area switching request includes information on a viewing area switching direction and a viewing area switching speed; calculate a size of each extended area based on at least one of the viewing area switching direction, the viewing area switching speed, and a location of an object to be displayed in each extended area; redecide a FOV area and a plurality of extended areas based on the calculated size of each extended area; and encode image data of the redecided FOV area and image data of the plurality of redecided extended areas and transmitting the encoded image data to the user device.

In accordance with still another embodiment, a user device may be provided for a virtual reality (VR) contents streaming service. The user device may include a communication circuit, a memory, and at least one processor, wherein the at least one processor may be configured to: generate a viewing area switching request to include information on a viewing area switching direction and a viewing area switching speed and transmit the generated viewing area switching request to a server; receive i) image data of a field of view (FOV) area and ii) image data of a plurality of extended areas wherein each extended area has a size dynamically controlled based on at least one of the viewing area switching direction, the viewing area switching speed, and objects to be included in each extended area; decode the received image data of the FOV area and the plurality of extended areas; and output the decoded image data of the FOV area.

The at least one processor may be configured to: monitor a latency time of receiving image data from the server according to switching of a viewing area.

The at least one processor may be configured to: decode only the image data of the FOV area if the latency time is shorter than a predetermined value; and decode the image data of the FOV area and at least one of the plurality of extended areas if the latency time is longer than the predetermined value.

The at least one processor may be configured to decode an image data of an extended area corresponding to the viewing area switching direction.

In accordance with yet another embodiment, a method of a user device may be provided for reproducing virtual reality (VR) contents. The method may include: receiving i) FOV image data of a field of view (FOV) area and ii) extended image data of a plurality of extended areas of each image frames of requested VR contents; selecting at least one of the plurality of extended areas according to a viewing area switching direction and a viewing area switching speed when a current FOV area is switched; independently and separately decoding the FOV image data of the FOV area and selected image data of the selected extended areas; and reproducing image frames of the VR contents by processing the decoded FOV image data and the decoded selected image data, and displaying the reproduced image frames.

In accordance with yet another embodiment, a method may be provided for providing, by a server, a virtual reality (VR) contents streaming service. The method may include receiving a request message for requesting a predetermined VR contents from a user device through a communication network; determining a field of view (FOV) area in each image frame of the predetermined VR contents and a plurality of extended areas adjacent to the FOV area; independently encoding i) FOV image data of the FOV area and ii) extended image data of the plurality of redecided extended areas; and separately transmitting the encoded FOV image data and the encoded extended image data to the user device in order to enable the user device to separately and independently decode at least one of the encoded FOV image data and the encoded extended image data of at least one of the extended areas.

DETAILED DESCRIPTION OF EMBODIMENTS

In accordance with at least one embodiment, a server may define a plurality of extended areas adjacent to a field of view (FOV) area in each image frame of VR contents and provide image data of the plurality of extended areas to a user device as well as image data of the FOV area. In order to enable the user device to select at least one of the extended areas, the server may independently and separately encode i) extended image data of a plurality of extended areas as well as ii) FOV image data of a FOV area in each image frame of the VR contents. In addition, the server may receive a viewing area switching request from the user device and redefine a FOV area and a plurality of extended areas according to information included in the viewing area switching request. The server may dynamically determine a size of each extended area based on at least one of a viewing area switching direction, a viewing area switching speed, and objects to be included in each extended areas.

Hereinafter, prior to describing embodiments of the present disclosure, a field of view (FOV) area of each image frame and encoding and decoding schemes for VR contents will be described with reference to FIG. 1A and FIG. 1B. In order to transmit the VR contents from a server to a user device, codec technologies, such as H.264 and HEVC may be used. Such codec technologies may improve a speed of encoding and decoding using a flexible macroblock ordering (FMO) to prevent a decoded image from deterioration.

Figure 1A:
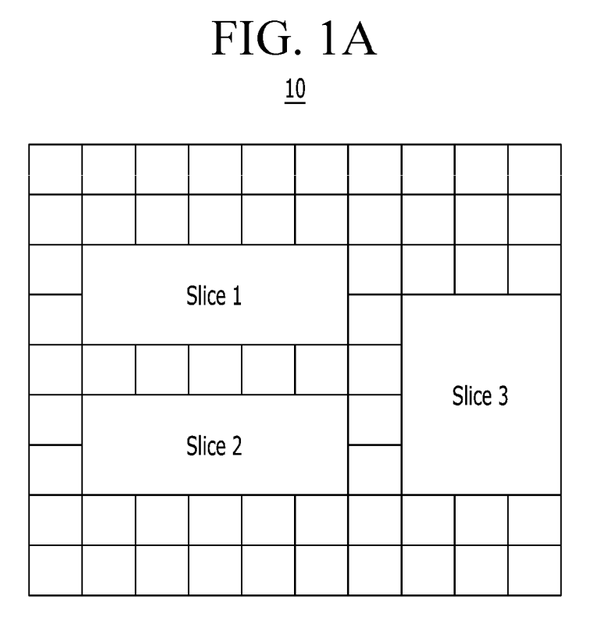
FIG. 1A and FIG. 1B are diagrams for explaining flexible macroblock ordering.
Figure 1B:
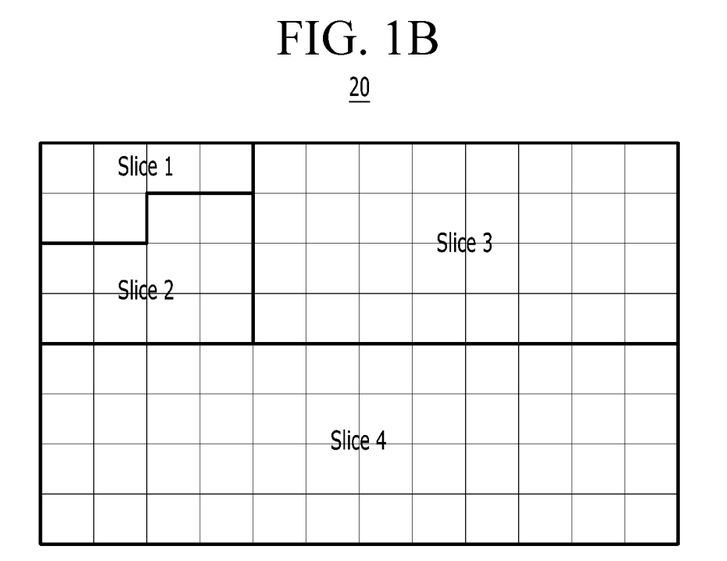

FIG. 1A and FIG. 1B are diagrams for explaining flexible macroblock ordering. Referring to FIG. 1A, in H.264 FMO technology, a server may i) divide an image frame (e.g., FOV area) into slices and tiles using a raster scan method, ii) encode the divided image slices and tiles, and iii) transmit the encoded image data slices and tiles to a terminal (e.g., HMD). The terminal may i) receive the encoded image slices and tiles, ii) decode the received image slices and tiles, and iii) reproduce the original image frame. Since the image frame is transmitted after being divided into slices and tiles, errors in one slice cannot influence the other. Accordingly, such method may prevent deterioration of the reproduce image frame. Further, H.264 FMO technology supports simultaneous decoding and decoding of slices and tiles. Referring to FIG. 1B, in the HEVC FOM technology, a server may divide an image frame into slices and tiles using a Largest Coding Unit (LCU).

As described, such a FMO based encoding/decoding scheme divides each image frame (e.g., FOV area) into predetermined slice groups as shown in FIGS. 1A and 1B. Such a FMO based encoding/decoding scheme may prevent deterioration of image quality. However, such a method provides image data of a FOV area of an image frame. Accordingly, when a user wearing the HMD turns a head to see other objects located outside of a FOV area (e.g., changing or switching a FOV area) by turning a head, it is necessary to request the server to redefine a new FOV area and provide image data thereof based on the changed FOV area. Accordingly, a large latency might be generated to obtain the image data of the changed FOV, and such a large latency cause motion sickness of the user.

In accordance with at least one embodiment, a server may define extended areas adjacent to a FOV area in each image frame of VR contents and provide image data of the extended areas as well as image data of the FOV area. Furthermore, the server may independently and separately encode the image data of the plurality of the extended areas as well as the image data of the FOV area. Such encoding scheme may enable the user device i) to select at least one of the extended areas, ii) independently decode the selected extended area, and iii) reproduce image data of a changed viewing area by combining the image data of the previous FOV area and the image data of the selected extended area while requesting the server to provide image data corresponding to the changed FOV area in accordance with at least one embodiment.

Figure 4:
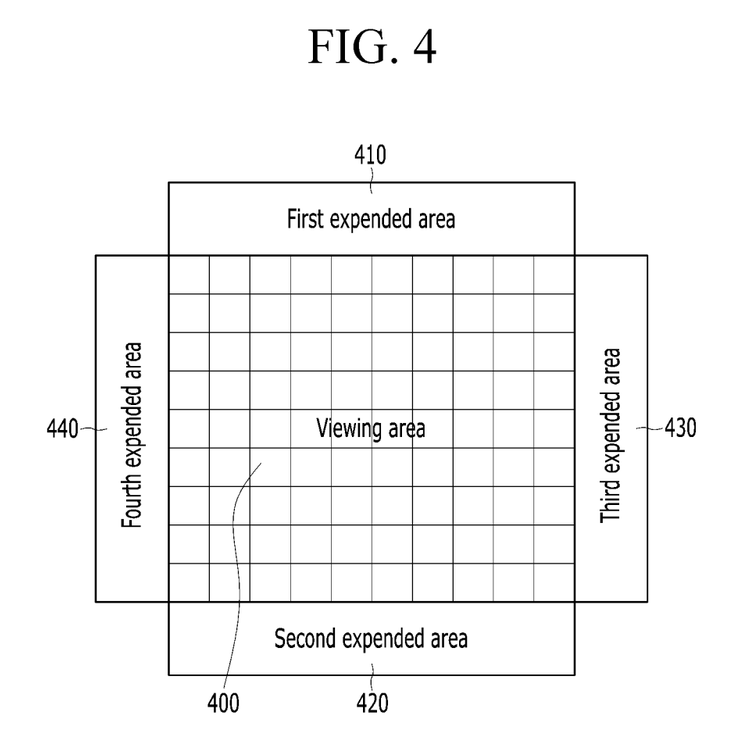
FIG. 4 illustrates a viewing area (e.g., Field of View (FOV) area) and extended areas adjacent to the viewing area.

FIG. 4 illustrates a field of view (FOV) area and extended areas in accordance with at least one embodiment of the present disclosure. Referring to FIG. 4, a server may define four extended areas 410, 420, 430, and 440, adjacent to a viewing area 400 (e.g., FOV area) in each image frame of VR contents in accordance with at least one embodiment. Although four extended areas 410, 420, 430, and 440 are illustrated, the embodiments of the present disclosure are not limited thereto. Further, the server may dynamically determine a size of each expanded area according to various factors and information of a user device, for example, a viewing area switching direction, a viewing area switching speed, objects in each expended area, and likes. Such a method of defining extended areas and dynamically changing a size thereof will be described in later.

Hereinafter, a VR contents streaming system in accordance with at least one embodiment will be described. In accordance with at least one embodiment, the VR contents streaming system may include a server and a user device coupled to the server through a communication network. Such a system will be described in more detail with reference to FIG. 2.

Figure 2:
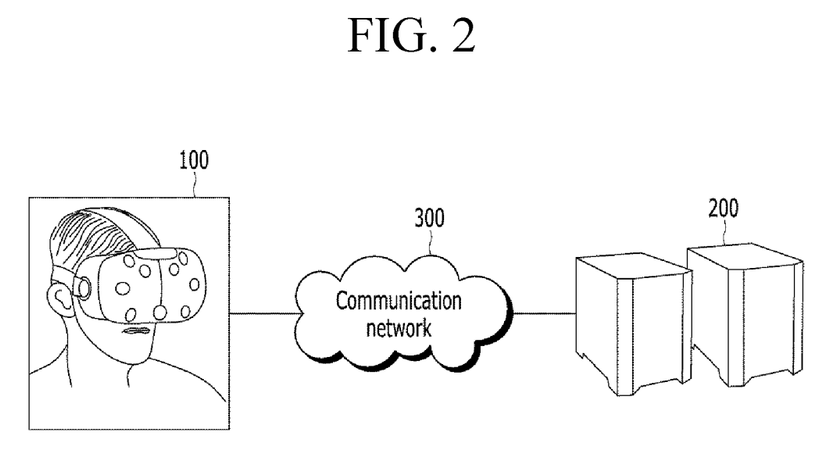
FIG. 2 illustrates a VR contents streaming system in accordance with at least one embodiment.

FIG. 2 illustrates a VR contents streaming system in accordance with at least one embodiment. Referring to FIG. 2, such a VR contents streaming system may include user device 100 and server 200 coupled to user device 100 through communication network 300. For example, user device 100 may communicate with server 200 through transmitting and receiving digital data (e.g., data packets) using predetermined communication protocol through communication network 300. Herein, communication network 300 may be any wired and wireless network that digitally connect user device 100 and server 200 to enable them to digital communicate to each other. In particular, communication network may include a local area network (LAN), metropolitan area network (MAN), or wide area network (WAN).

In accordance with at least one embodiment, user device 100 may be an electronic device including a processor, a memory, a communication circuit, sensors, and output devices (e.g., displays, speakers, and vibrators), which is capable of i) transmitting a request for predetermined VR contents to server 200, ii) receiving image data of the predetermined VR contents, and iii) reproducing and output the predetermined VR contents through at least one of output devices by decoding the received image data. For example, user device 100 may be a head mounted device (HMD).

User device 100 may transmit a request for predetermined VR contents to server 200 through communication network 300. The request may be a data packet generated in a predetermined format according to a communication protocol supported by both of parties, user device 100 and server 200. In response, user device 100 may independently and separately receive i) encoded image data of a Field of view (FOV) area of the predetermined VR contents and ii) encoded data of a plurality of expanded areas adjacent to the FOV area from server 200 in accordance with at least one embodiment.

User device 100 may include various types of sensors (e.g., acceleration sensor and gyro sensor), monitor motions of a user based on sensing results of the sensors, and determine a viewing area (e.g., Field of View) of the user in a virtual reality (VR) space produced based on the predetermined VR contents. Based on such monitoring results and the determination results, user device 100 may compute a viewing area switching direction and a viewing area switching speed when a user switches a viewing area (e.g., FOV) by rotating or turning a head of the user.

User device 100 may transmit information on the monitoring results to server 200 in accordance with at least one embodiment. For example, when user device 100 detects switching of a viewing area, user device 100 may generate a viewing area switching request and transmit the viewing area switching request to server 200. The viewing area switching request may be generated in a predetermined data format including information on the viewing area switching direction and the viewing area switching speed, calculated and estimated based on the monitoring results.

In response to the viewing area switching request, user device 100 may independently and separately receive i) image data of a updated FOV area and ii) image data of at least one of a plurality of updated extended areas, which are re-determined based on the viewing area switching request, from server 200.

In accordance with at least one embodiment, user device 100 may independently or separately decode i) image data of the FOV area and ii) image data of the plurality of extended areas. The received image data may be encoded through graphic processing unit (GPU) based parallel processing at server 200. For decoding, user device 100 may independently and separately decode the received image data of the FOV area and the extended areas. That is, user device 100 may select at least one of the extended areas and decode image data of the selected extended area, independently and separately. Alternatively, user device 100 may simultaneously decode image data of the FOV area and the extended areas in parallel using threads.

As described, user device 100 may receive VR contents streamed from server 200, reproduce a virtual space of the VR contents, and enable a user to experience the VR space within the VR contents from server 200 in accordance with at least one embodiment.

Server 200 may be a computing system including a processor, a memory, a communication circuit, capable of i) receiving a VR contents request or a viewing area switching request from user device 100, ii) determining a FOV area and corresponding extended areas, iii) separately and independently encode a) image data of the FOV area and b) image data of corresponding extended areas, and iv) transmit the encoded image data to user device 100 in accordance with at least one embodiment.

As described, server 200 may receive a request message of predetermined VR contents from user device 100. Such a request message may be generated in a predetermined format for communicating through communication network 300 according to the predetermined communication protocol.

Server 200 may determine a field of view (FOV) area and a plurality of extended areas in each image frame of VR contents in accordance with at least one embodiment. The extended areas may be image slices or tiles adjacent to the FOV area. Sizes of such extended areas may be determined based on at least one of i) objects to be displayed in corresponding extended area, ii) a viewing area switching direction, and iii) a viewing area switching speed. Such a method will be described in more detail.

Server 200 may encode i) image data of the FOV area and ii) image data of the plurality of extended areas. In accordance with at least one embodiment, i) image data of the FOV area and ii) image data of the plurality of extended areas may be separately and independently encoded. Accordingly, such encoding method may enable user device 100 to select at least one of areas to be decoded and to separately and independently decode image data of the selected areas (e.g., extended area or FOA area).

Server 200 may receive a viewing area switching request from user device 100 in accordance with at least one embodiment. The viewing area switching request may include information on a viewing area switching speed and a viewing area switching direction of user device 100.

In response to the viewing area switching request, server 200 may recalculate a FOV and extended areas based on the viewing area switching direction and the viewing area switching speed in the viewing area switching request. Server 200 may separately and independently encode i) image data of the recalculated FOA and ii) image data of at least one of the recalculated extended areas and transmit the encoded image data to user device 100.

Figure 3:
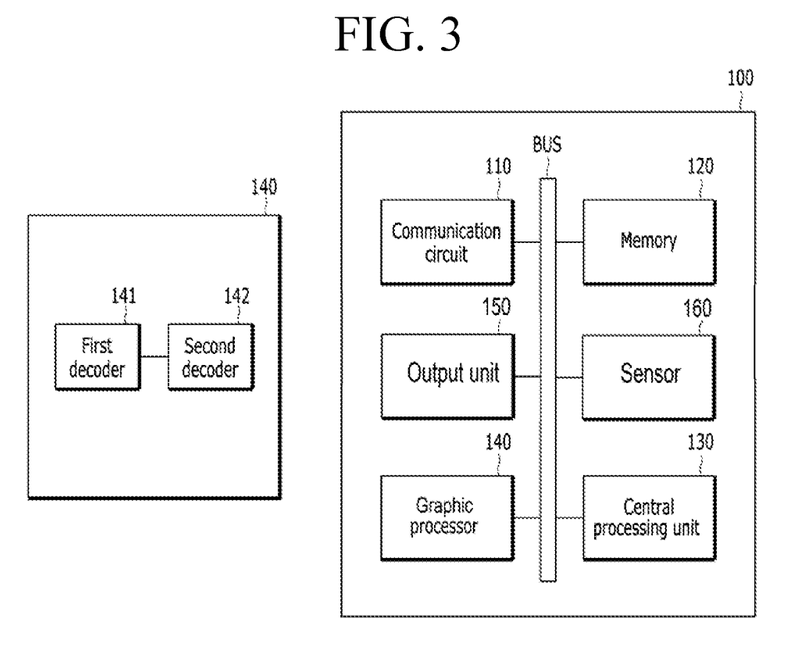
FIG. 3 illustrates a user device in accordance with at least one embodiment.

Hereinafter, a hardware structure of user device 100 will be described in more detail with reference to FIG. 3. FIG. 3 illustrates a user device in accordance with at least one embodiment. Referring to FIG. 3, user device 100 may include communication circuit 110, memory 120, central processing unit 130, graphic processor 140, output unit 150, and sensor 160. Further, graphic processor 140 may include first decoder 141 and second decoder 142.

Communication circuit 110 may include at least one module for communicating with other parties through a wired or wireless communication link. For example, communication circuit 110 may include any or all of a broadcasting signal receiving module, a mobile communication module, a wireless Internet module, a short-distance communication module, and a location information module.

Memory 120 may be used as a data storage device of user device 100. For example, memory 120 may store information necessary for operating user device 100 and performing certain operations requested by a user. Such information may include any software programs and related data. For example, memory 120 may store an operation system data, applications, and related data, received from an external device through a physical cable and downloaded from a related server through a communication link. In accordance with at least one embodiment, memory 120 may store information on user device identification, requested VR contents, temporally generated intermediate VR data, encoded image data of a current FOV area and extended areas, encoded image data of previous FOV area and extended area, the collected information, such as a switching direction and a switching speed, and likes. Memory 120 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. Memory 120 may be a SD card or a USB memory, but the present invention is not limited thereto.

Central processing unit 130 may be a processor configured to control overall operation of the constituent elements of user device 100. Particularly, central processing unit 130 may perform operations necessary for driving the constituent elements of user device 100 to receive requested VR contents, reproduce VR contents, and outputs the reproduced VR contents through output unit 150.

Graphic processor 140 may be a processor configured to perform operations for reproducing each image data of VR contents in cooperation with central processing unit 130. Particularly, graphic processor 140 may separately and independently encode and decode image data of FOA area and extended areas in each image frame of VR contents. Furthermore, graphic processor 140 may process image data and reproduce each image frame of the requested VR.

Output unit 150 may be an output device for visually displaying information to form a virtual reality space based on received VR contents from server 200. For example, output unit 150 may include a display may display image data produced or processed by graphic processor 140 and/or central processing unit 130. Output unit 150 may be a liquid crystal display (LCD) panel or an active-matrix organic light-emitting diode (AMOLED) panel, but the present invention is not limited thereto. Furthermore, output unit 150 may include speakers and various types of devices (e.g., vibrators) for providing virtual reality 3D space to a user.

Although it is not shown in FIG. 3, user device 100 may include an input unit. The input unit may be a user interface for receiving input from a user. Such an input unit may be realized in various types. For example, the input unit may include any of a keypad, a dome switch, a touch pad, a jog wheel, and a jog switch, but is not limited thereto. Further, the input unit may be sensor 160 that detects a user input based on the sensing result of sensor 160. For example, sensor 160 may detect one of objects displayed in a virtual reality 3D space, which a view point of eyes of a user is focused at, and indicate it as an input of selecting the object when the view point stays for a predetermined time period.

Sensor 160 may collect information on status of user device 100. For example, sensor 160 may sense location, motion, acceleration and deceleration of user device 100, or physical contact with or proximity to a user. Based on the collected information on status of user device 100, sensor 160 may generate a sensing signal and provide it to central processing unit 130 and graphic processor 140. For example, sensor 160 may collect information on directions and speed of turn or move of user device 100 and provide the collected information to at least one of central processing unit 130 and graphic processor 140. Such collected information may be temporally stored in memory 120.

In accordance with at least one embodiment, communication circuit 110 may transmit a viewing area switching request to server 200 when user device 100 detects that user switches a viewing area. The viewing area switching request may include a viewing area switching direction and a viewing area switching speed. For example, sensor 160 may detect a direction of switching a viewing area of user device 100 and transmit the detection signal to central processing unit 130. Sensor 160 may include an acceleration sensor may measure a speed of a viewing area switching and transmit the detection signal to central processing unit 130. Central processing unit 130 may collect the information of the viewing area switching direction and speed and generate a viewing area switching request. Communication circuit 110 may transmit the viewing area switching request to server 200.

Communication circuit 110 may receive i) encoded image data of a FOV and ii) encoded image data of at least one of a plurality of extended areas from server 200. FIG. 4 illustrates a viewing area (e.g., Field of View (FOV) area) and extended areas adjacent to the viewing area. Referring to FIG. 4, a plurality of extended areas may include first extended area 410 adjacent to the top of the FOV area, second extended area 420 adjacent to the bottom of the FOV area, third extended area 430 adjacent to the right side of the FOV area, and fourth extended area 440 adjacent to the left side of the FOV area. However, the embodiments of the present disclosure are not limited thereto.

In response to a viewing area switching request transmitted to server 200, communication circuit 110 may receive image data of a FOV and a plurality of extended areas from server 200, which are recalculated corresponding to the viewing area switching request. Herein, a size of each extended area may be changed based on i) at least one object locations displayed at the corresponding extended areas, ii) a viewing area switching direction, and iii) a viewing area switching speed. For example, a size of an extended area corresponding to a viewing area switching direction may be further increased than sizes of the other extended areas. For another example, when user device 100 switches a view area in a right direction, a size of a third extended area is further increased than a size of a fourth extended area. For still another example, as a viewing area switching speed of user device 100 increases, a size of corresponding extended area increases in proportional to the viewing area switching speed. For example, a size of each extended area may be determined to include all objects outputted in a corresponding extended area.

Central processing unit 130 may monitor latency in streaming image data received from server 200 according to switching a viewing area of user device 100. For example, central processing unit 130 may monitor latency until receiving updated image data of a recalculated FOV area and recalculated extended areas corresponding to a viewing area switching request. Also, central processing unit 130 may monitor latency until receiving updated image data of recalculated FOA area and recalculated extended viewing areas and outputting the reproduced image corresponding to the viewing area switching request.

In cooperation with central processing unit 130, graphic processor 140 may independently and separately decode i) image data of FOV area and ii) image data of at least one of the plurality of extended areas in accordance with at least one embodiment. Such graphic processor 140 may include first decoder 141 and second decoder 142.

First decoder 141 may decode only image data of a FOA area when the monitored latency is smaller than a predetermined threshold value.

Second decoder 142 may independently and separately decode image data of at least one of extended areas as well as image data of FOV area when the monitored latency is greater than the predetermined threshold value. For example, second decoder 142 may additionally decode extended areas corresponding to a viewing area switching direction among the plurality of extended areas, as well as a FOV area.

Output unit 150 may output the decoded image data of FOA area and extended areas. For example, output unit 150 may be a display unit, but not limited thereto. Output unit 150 may include speakers and vibrators for outputting sounds and vibrations based on the predetermined VR contents.

Figure 5A:
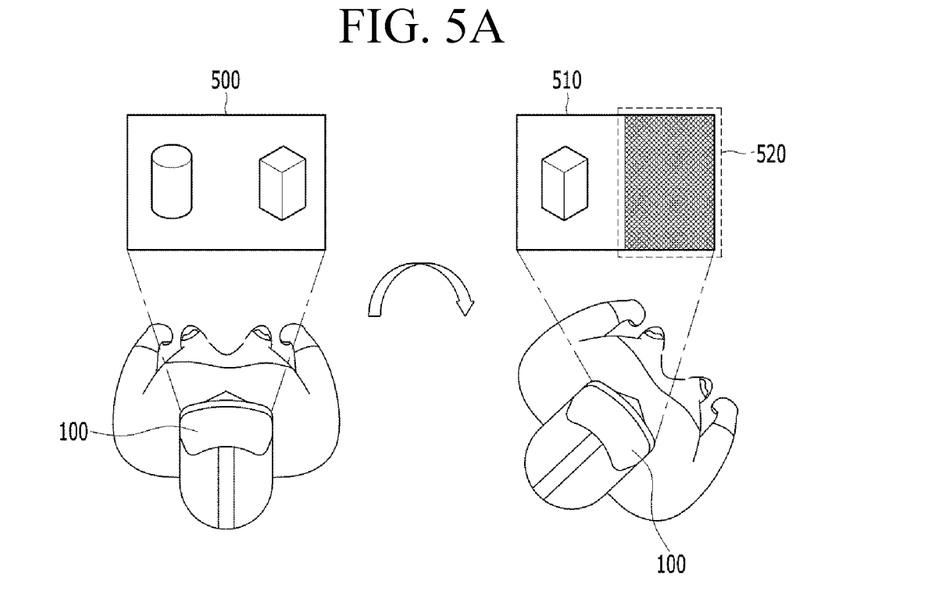
FIG. 5A is a diagram for explaining a typical VR contents streaming method.
Figure 5B:
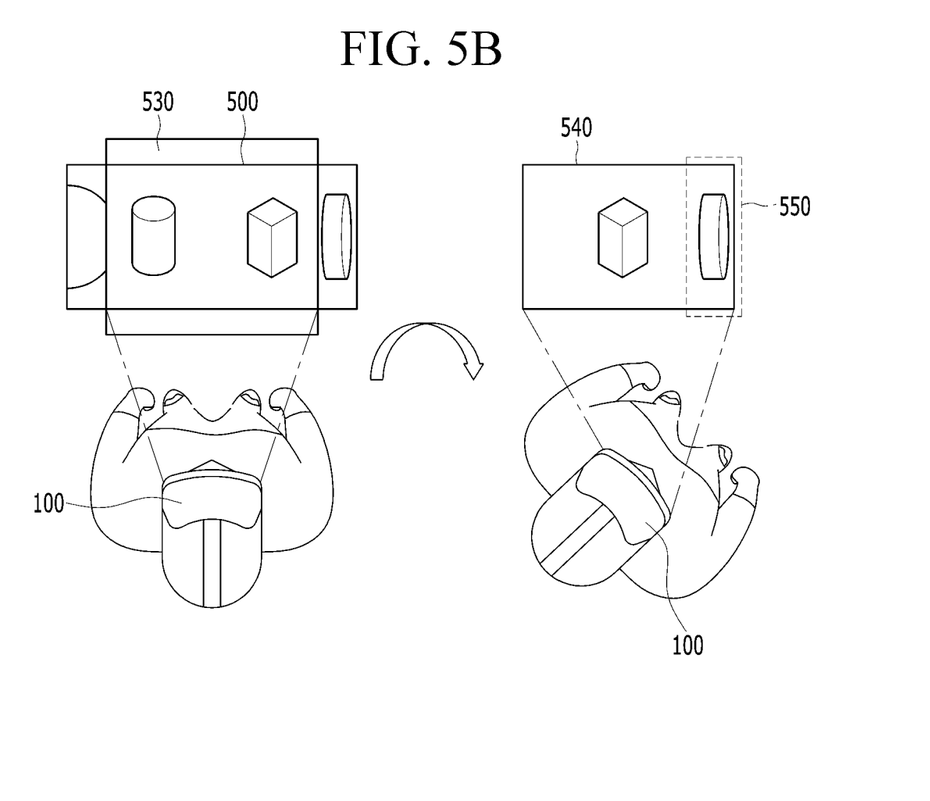
FIG. 5B is a diagram for explaining a VR contents streaming method in accordance with at least one embodiment.

FIG. 5A is a diagram for explaining a typical VR contents streaming method and FIG. 5B is a diagram for explaining a VR contents streaming method in accordance with at least one embodiment.

Referring to FIG. 5A, in the typical VR contents streaming method, server 200 may determine a FOV area 500, encode only image data of the FOV area 500, and transmit the encoded image data of FOV area 500 to user device 100 (e.g., HMD). Accordingly, when a viewing area (e.g., FOV) is changed or switched by turning user device 100 to one direction (e.g., right, left, top and bottom), there is latency for obtaining new image data of a changed viewing area from server 200 by determining a new FOV area 510 and 520 and transmitting encoded image data of the new FOV area 510 and 520 to user device 100.

Referring to FIG. 5B, in the VR contents streaming method according to the present embodiment, server 200 may determine not only a FOV area 500 but also a plurality of extended areas 530 and 550 adjacent to the FOV area 500, independently encode i) image data of the FOV area and ii) image data of at least one of extended areas, and separately transmit i) encoded FOV image data and ii) encoded extended image data to user device 100. Since i) image data of the FOV area and ii) image data of at least one of extended areas are independently encoded and separately transmitted, user device 100 may select one of extended areas according to viewing area switching direction and speed, independently decode image data of the selected extended area, and display the decoded image 500 with image data of the previous FOV area 540. Therefore, user device 100 may not need to obtain update image data of the changed view area (e.g. one of extended areas) from server 200 whenever user device 100 switches a viewing area.

Accordingly, VR contents may be seamlessly provided to a user without significant latency, and a motion sickness problem may be significantly reduced in accordance with at least one embodiment.

Figure 6:
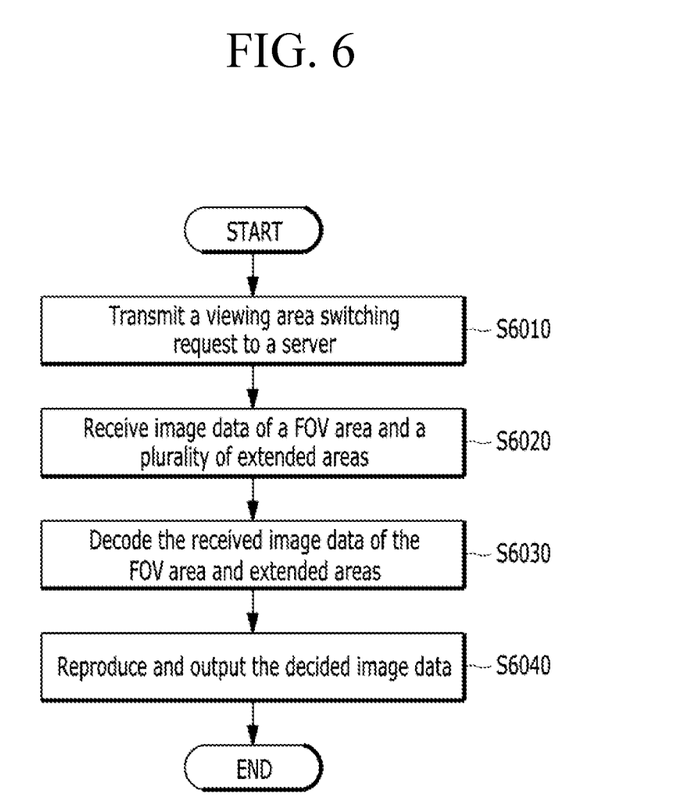
FIG. 6 is a flowchart illustrates operations of a user device in accordance with at least one embodiment.

Hereinafter, overall operations of user device 100 will be described with reference to FIG. 6. FIG. 6 is a flowchart illustrates operations of a user device in accordance with at least one embodiment. Referring to FIG. 6, a viewing area switching request may be transmitted at step S6010. For example, user device 100 monitors motions of user device 100 to determine switching of a viewing area. During the monitoring, user device 100 collects information on a viewing area switching direction and a viewing area switching speed based on the monitoring results. When the switching of the viewing area is detected, user device 100 generates a viewing area switching request including the collected information, and transmits the generated viewing area switching request. Such a request may be digital data generated in a predetermined format to be transmitted to server 200 through communication network.

Further, prior to step S6010, user device 100 may continually and sequentially receive separately and independently encoded image data of previous FOV area and corresponding extended areas of each image frame of the requested VR contents from server 200. User device 100 may select the encoded image data of previous FOV area, decode the selected image data only, and display image frames of the previous FOV area to reproduce VR contents.

When user device 100 switches a viewing area by turning the head (e.g., user device 100) in one direction to see other objects in an extended area in the one direction, user device 100 may select a corresponding extended area from the previous extended areas, independently decode only the encoded image data of the selected extended area, reproduce image frames by combining the decoded image data of the selected previous extended area and the decoded image data of the previous FOV area, and display the reproduced image frames. Such operations may be simultaneously performed while user device 100 generates a viewing area switching request, transmits the viewing area switching request to server 200 at step S6010, receives encoded image data of updated FOV area and updated extended areas, and reproduces image frames based on the received encoded image data of the updated FOV area and the updated extended areas.

At step S6020, i) encoded FOV image data of a FOV area and ii) encoded extended image data of at least one of a plurality of extended areas may be received. For example, user device 100 receives i) encoded FOV image data of a FOV area and ii) encoded extended image data of at least one of a plurality of extended areas, which are separated and independent from each other, from server 200. The image data may be encoded according to a predetermined VR encoding scheme. A size of each extended area may be dynamically controlled according to at least one of a FOV area, a viewing area switching speed, a viewing area switching direction, and objects to be included in the extended areas.

At step S6030, the received encoded FOV image data of the FOV area and encoded extended image data of the plurality of extended areas may be decoded. For example, user device 100 separately or simultaneously decodes the received image data of the FOV data and the plurality of extended areas.

At step S6040, the decoded image data may be processed as an original image, and the original image may be outputted on user device 100. For example, user device 100 reproduces VR contents by processing the decoded image data and outputs the reproduced VR contents.

Although it is not shown in FIG. 6, prior to S6010, user device 100 may transmit a request message for predetermined VR contents through communication network 300 to server 200. In response, server 200 may i) define a FOV area of each image frame of the requested VR contents and a plurality of extended areas adjacent to the FOV area, ii) independently and separately encode a) FOV image data of the FOV area and b) extended image data of the plurality of extended areas, and iii) transmit the encoded FOV images data and the encoded extended image data to user device 100 in accordance with at least one embodiment. Server 200 may continuously perform the above operations i) to iii) for each image frame of the requested VR contents until redefining a FOV area according to the viewing area switching request in accordance with at least one embodiment.

In addition, after user device 100 detects switching of a viewing area (e.g., FOV area), user device 100 may select one of the extended areas according to a viewing area switching, decode image data of the selected extended area, which is previously received from server 200, reproduce an image frame by combining the decoded image data of the selected extended area and decoded image data of a current FOV area until receiving updated image data according to the viewing area switching request in accordance with at least one embodiment.

Figure 7:
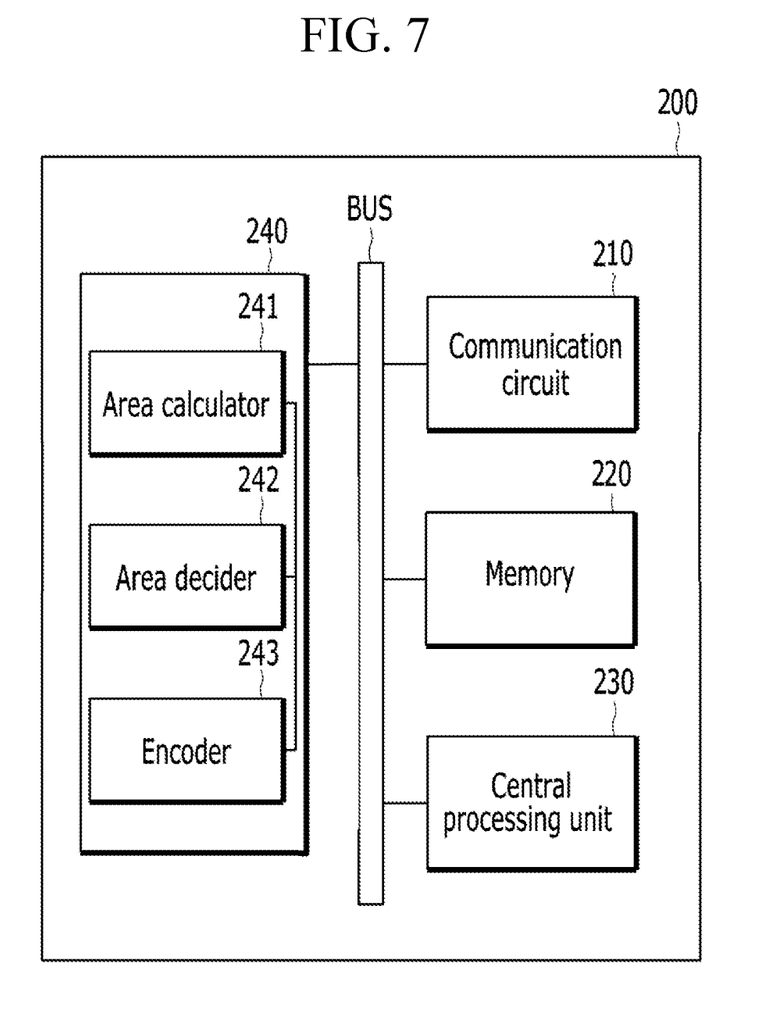
FIG. 7 is a block diagram illustrates a server for providing a VR contents streaming service in accordance with at least one embodiment.

FIG. 7 is a block diagram illustrates a server for providing a VR contents streaming service in accordance with at least one embodiment. Referring to FIG. 7, server 200 may be a computer system including communication circuit 210, memory 220, central processing unit 230, and graphic processor 240. Graphic processor 240 may further include area calculator 241, area decider 242, and encoder 243.

Communication circuit 210 may include at least one module for communicating with other parties (e.g., user device 100) through a wired or wireless communication link. For example, communication circuit 210 may include any or all of a broadcasting signal receiving module, a mobile communication module, a wireless Internet module, a short-distance communication module, and a location information module.

Memory 220 may be used as a data storage device of server 200. For example, memory 220 may store information necessary for operating server 200 and performing certain operations requested by a user. Such information may include any software programs and related data. For example, memory 220 may store an operation system data, applications, and related data, received from an external device through a physical cable and downloaded from a related server through a communication link. In accordance with at least one embodiment, memory 220 may store information on a plurality of VR contents, encoded image data of VR contents, and likes. Memory 220 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

Central processing unit 230 may be a processor configured to control overall operation of the constituent elements of server 200. Particularly, central processing unit 230 may perform operations necessary for driving the constituent elements of server 200 to separately and independently encode image data of each image frame of VR contents and provide the VR contents.

Graphic processor 240 may be a processor configured to perform operations for separately and independently encoding image data of VR contents in cooperation with central processing unit 130. Particularly, graphic processor 240 may separately and independently encode image data of FOA area and extended areas in each image frame of VR contents.

Graphic processor 240 may determine (e.g., decide or calculate) a FOV area of user device 100 in VR contents and determine a plurality of extended areas based on the determined FOV area in accordance with at least one embodiment. Referring back to FIG. 4, processor may determine four extended areas adjacent to the determined FOV area.

Communication circuit 210 may receive a VR contents request and a viewing area switching request from user equipment 100 through communication network 300. The viewing area switching request may include information on a viewing area switching direction and a viewing area switching speed.

Graphic processor 240 (e.g., area calculator 241) may calculate a size of each extended area based on at least one of the viewing area switching direction, the viewing area switching speed, and locations of objects in the extended areas. In accordance with at least one embodiment, a size of each extended area may be calculated using following equation.

$$\Delta\text{width} = ws \times sr \times (\alpha V + \beta D) \quad \text{Equation 1}$$

$$\Delta\text{height} = hs \times (\alpha V + \beta D)$$

$$\therefore ws = 1 (\text{if}(X_s - X_c) \times (X_{cc} - X_{pc}) > 0) \text{ or}$$

$$-1 (\text{if}(X_s - X_c) \times (X_{cc} - X_p) < 0)$$

$$\therefore hs = 1 (\text{if}(Y_a - Y_c) \times (Y_c - Y_{pc}) > 0) \text{ or}$$

$$-1 (\text{if}(Y_s - Y_c) \times (Y_{cc} - Y_{pc}) < 0)$$

$$\therefore X_s Y_s = \text{position value of } X,$$

$Y$ to start to extend $$\therefore X_c Y_c = \text{position value of center of } X,$$

$Y$ of the frame, $cc$ = current center, $pc$ = previous center $$\therefore sr(\text{screen ratio}) = \frac{\text{width}}{\text{height}}$$

$$\therefore \alpha V + \beta D: \text{bilinear interpolation } (\alpha + \beta = 1)$$

$$\therefore V = \frac{\text{distance}}{\text{time}}$$

$\therefore D$ = distance of important object nearby

In Equation 1, a width variation (Δwidth) and a height variation (Δheight) may be applied whenever a plurality of extended areas are determined, and calculated by server 200 per each frame of VR contents. Sr denotes a screen ratio (height/width), and the width increases more than the height. V denotes a speed, D denotes a distance between a FOV area and a predetermined object in each extended area. A relation between V and D is based on bilinear interpolation. According to V and D, α and β are calculated. Based on these factors, the weight variation and the height variation are calculated.

As described in Equation 1, graphic processor 240 may increase a size of an extended area corresponding to a viewing area switching direction.

Graphic processor 240 may determine a size of an extended area corresponding to a viewing area switching direction based on a viewing area switching speed.

Graphic processor 240 may calculate a distance between a FOV area and a predetermined object in each extended area and determine a size of each extended area based on the distance. For example, when a user switches a viewing area in one direction, there is a large possibility that the user will stare an objection in an extended area of the switching direction. Accordingly, graphic processor 240 increases a size of an extended area corresponding to the one switching direction to include all objects when each extended area includes objects more than a predetermined ratio.

Graphic processor 240 may recalculate a new FOV area and a plurality of new extended areas based on the calculated size of each extended area. Graphic processor 240 may recalculate e a FOV and a plurality of extended areas per each image frame in accordance with at least one embodiment.

Encoder 243 may encode image data of the recalculated FOV area and image data of recalculated extended areas. For example, encoder 243 may independently and separately encode i) image data of a FOV area and ii) image data of each extended area. Accordingly, user device 100 may selectively decode i) image data of desired extended area among the plurality of extended areas.

Communication circuit 210 may transmit the encoded image data of a FOV area and a plurality of extended areas to user device 100 through communication network 300. In accordance with at least one embodiment, communication circuit 210 may independently and separately transmit encoded image data of a FOV area and a plurality of extended areas.

Memory 220 may store i) data input and output through each constituent element of server 200 and ii) data input and output between server 200 and other entities through communication network 300.

Figure 8:
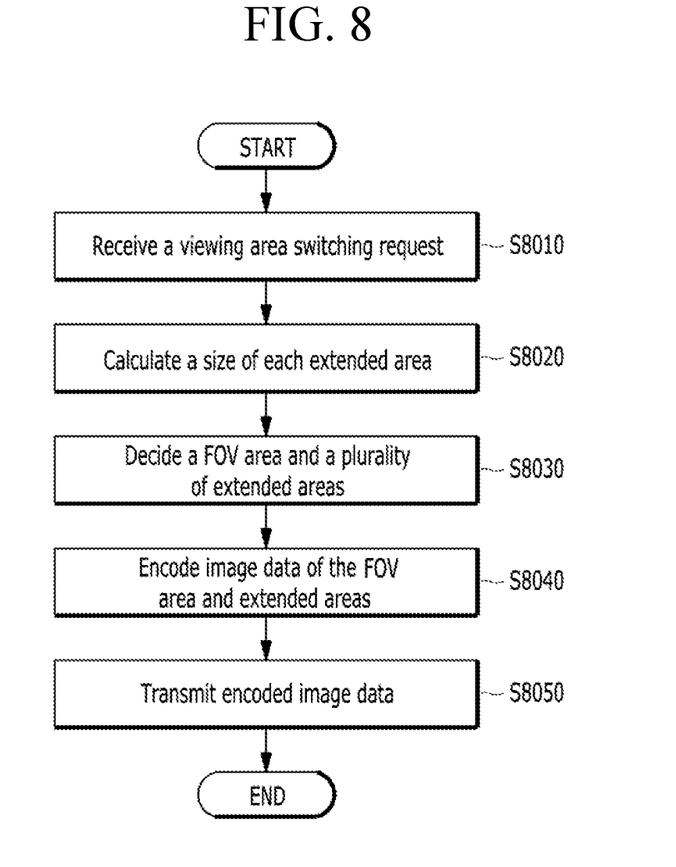
FIG. 8 is a flowchart illustrating operations of a server for providing a VR contents streaming service in accordance with at least one embodiment.

FIG. 8 is a flowchart illustrating operations of a server for providing a VR contents streaming service in accordance with at least one embodiment. Referring to FIG. 8, a viewing area switching request may be received at step S8010. For example, server 200 receives a viewing area switching request from user device 100. The viewing area switching request may include information on a viewing area switching direction and a viewing area switching speed.

Prior to the step S8020, server 200 may receive a request for predetermined VR contents, which is generated by user device 100 and transmitted through communication network 300. Then, server 200 may receive the request message, analyze the received request message, prepare the requested VR contents by fetching information of the requested VR contents from memory (e.g., database), and transmit the requested VR contents to user device 100 through communication network 300. As described above, server 200 may determine an initial FOV area and a plurality of extended areas in each image frame of the requested VR contents, independently and separately encode image data of the determined FOV area and the plurality of the extended areas according to information in the request message, and transmit the encoded image data to user device 100. Further, server 200 may regularly perform operations of: determining a FOV area and a plurality of extended areas, independently and separately encoding image data of the FOV area and extended areas, and transmitting the encoded image data.

Such operations may be performed in predetermined intervals. The performing of the above operation may continue until the receipt of a viewing area switching request.

Referring back to step S8020, a size of each extended area may be calculated. Server 200 calculates a size of each extended area based on at least one of a viewing area switching direction, a viewing area switching speed, and objects included in each extended area.

At step S8030, a FOV area and a plurality of extended areas may be decided. For example, server 200 decides a FOV area and a plurality of extended areas in an image frame of the predetermined VR contents based on the calculated size of each extended area.

At step S8040, i) FOV image data of the FOV area and ii) extended image data of the plurality of extended areas may be encoded. For example, server 200 separately and independently encodes i) the FOV image data of the FOV area and ii) the extended image data of at least one of the plurality of decided extended areas.

At step S8050, i) encoded FOV image data of the FOV area and ii) encoded extended image data of the plurality of extended areas may be transmitted. For example, server 200 transmits i) encoded FOV image data of the FOV area and ii) encoded extended image data of the plurality of extended areas to user device 100 through communication network 300.

Although it is not shown in FIG. 8, prior to S8010, user device 100 may transmit a request message for predetermined VR contents through communication network 300 to server 200. In response, server 200 may i) define a FOV area of each image frame of the requested VR contents and a plurality of extended areas adjacent to the FOV area, ii) independently and separately encode a) FOV image data of the FOV area and b) extended image data of the plurality of extended areas, and iii) transmit the encoded FOV images data and the encoded extended image data to user device 100 in accordance with at least one embodiment. Server 200 may continuously perform the above operations i) to iii) for each image frame of the requested VR contents until redefining a FOV area according to the viewing area switching request in accordance with at least one embodiment.

Figure 9:
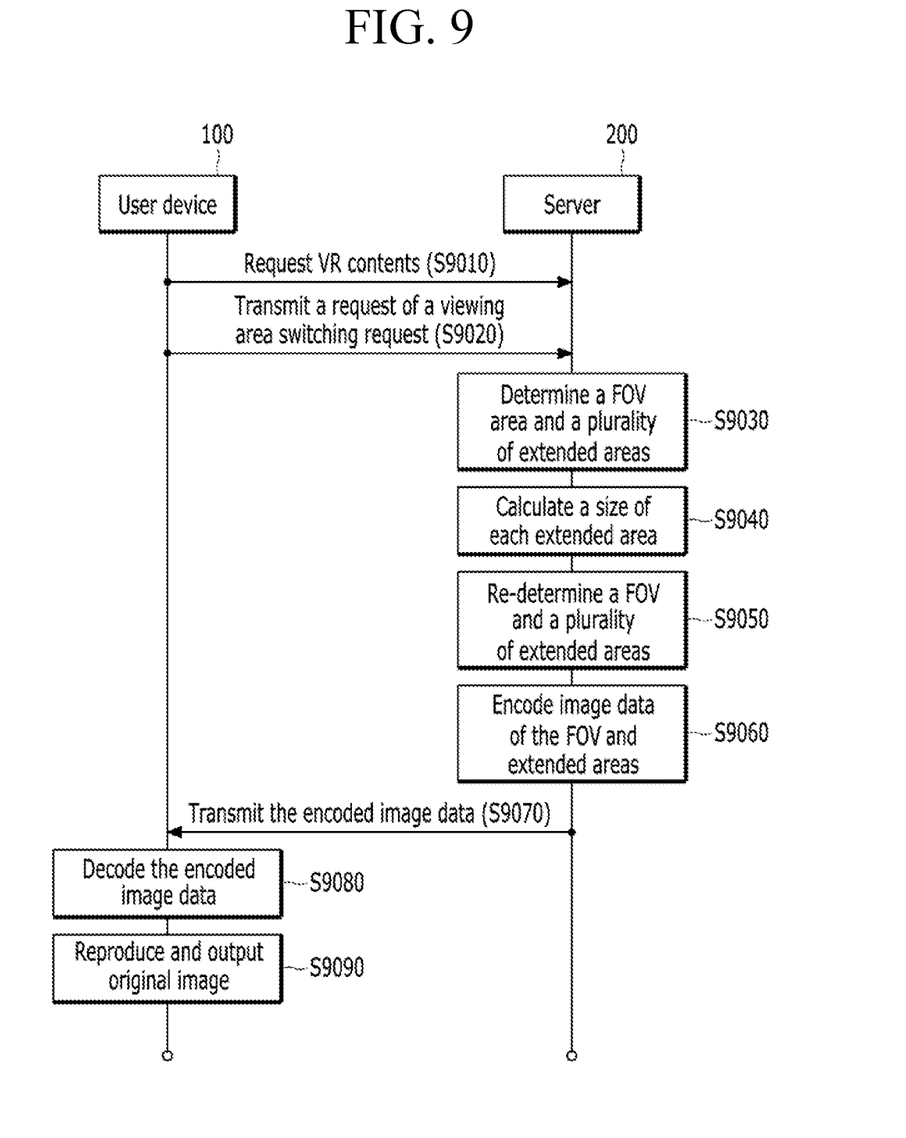
FIG. 9 illustrates a VR contents streaming service in accordance with at least one embodiment.

FIG. 9 illustrates a VR contents streaming service in accordance with at least one embodiment. Referring to FIG. 9, server 200 transmits VR contents to user device 100 in response to a VR contents request at step S9010. For example, a user may put on user device 100 on a head and control user device 100 to request predetermined VR contents through various methods, such as clicking a predetermined button coupled to user device 100 or staring at least one of virtual icons displayed in previously reproduced and displayed a 3D virtual space. Then, user device 100 may i) generate a request message including information on identification, status, and capabilities (e.g., spec) of user device 100, message formats (e.g., communication protocol types), an initial viewing area, and requested VR contents, in a predetermined format, and ii) transmit the generated request message to server 200 through communication network 300. Then, server 200 may receive the request message, analyze the received request message, prepare the requested VR contents by fetching information of the requested VR contents from memory (e.g., database), and transmit the requested VR contents to user device 100 through communication network 300. As described above, server 200 may determine an initial FOV area and a plurality of extended areas in each image frame of the requested VR contents, independently and separately encode image data of the determined FOV area and the plurality of the extended areas according to information in the request message, and transmit the encoded image data to user device 100. Further, server 200 may regularly perform operations of: determining a FOV area and a plurality of extended areas, independently and separately encoding image data of the FOV area and extended areas, and transmitting the encoded image data. Such operations may be performed in predetermined intervals. The performing of the above operation may continue until the receipt of a viewing area switching request.

At step S9020, user device 100 transmits a viewing area switching request to server 200 when a user switch a viewing area, wherein the viewing area switching request may include information on a viewing area switching direction and a viewing area switching speed. For example, in response to the request, user device 100 may receive the encoded image data of FOV area and extended areas of each image frame of the requested VR contents, select the encoded image data of FOV area only, decode the encoded image data of FOV area, and display image frames of the requested VR contents using the decoded imaged data of FOV area.

When user device 100 switches a viewing area by turning the head (e.g., user device 100) in one direction to see other objects in an extended area in the one direction, user device 100 may select a corresponding extended area, decode the encoded image data of the selected extended area, which was independently and separately encoded in server 200, reproduce image frames by combining the decoded image data of the selected extended area and the decoded image data of the previous FOV area, and display the reproduced image frames. Such operations may be simultaneously performed while user device 100 generates a viewing area switching request, transmits the viewing area switching request to server 200, receives encoded image data of updated FOV area and updated extended areas, and reproduces image frames based on the received encoded image data of the updated FOV area and the updated extended areas.

At step S9030, server 200 determines a FOV area and a plurality of extended areas of each image frame of the VR contents based on the viewing area switching request. As described, server 200 may determine a updated FOV area based on the switched viewing area, and updated extended areas based on the updated FOV area in response to the received viewing area switching request. At step S9040, server 200 calculates a size of each extended area based on at least one of the viewing area switching direction, the viewing area switching speed, and objects included in each extended area. As described, server 200 may dynamically adjust a size of each extended area various factors. In particular, server 200 may use the Equation 1 for deciding the size of each extended area. At step S9050, server 200 recalculates an updated FOV area and a plurality of updated extended areas based on the calculated size of each extended area.

At step S9060, server 200 separately and independently encodes i) FOV image data of the recalculated FOV area and ii) extended image data of extended areas. At step S9070, server 200 transmits the encoded FOV image data and extended image data to user device 100. At step S9080, user device 100 receives and decodes the encoded image data from server 200. At step S9090, user device 100 outputs the decoded image data of FOV area.

In the step S9070, server 200 may increase a size of an extended area corresponding to a viewing area switching direction. In the step S9070, server 200 may decide a size of an extended area corresponding to a viewing area switching direction based on a viewing area switching speed. In the step S9070, server 200 may calculate a distance between a FOV area and an object to be outputted at each extended area and decide a size of each extended area based on the calculated distanced. In the step S9070, server 200 may increase a size of each extended area to include all objects when each extended area includes objects more than a predetermined ratio.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing, by a server, a virtual reality (VR) contents streaming service, the method comprising:
  receiving a request message for requesting a predetermined VR contents from a user device through a communication network;
  defining a field of view (FOV) area in each image frame of the predetermined VR contents and a plurality of extended areas adjacent to the FOV area;
  receiving a viewing area switching request from the user device, wherein the viewing area switching request includes information on a viewing area switching direction and a viewing area switching speed;
  calculate a size of each extended area based on at least one of the viewing area switching direction, the viewing area switching speed, and a location of an object to be displayed in each extended area;
  redefining a FOV area and a plurality of extended areas based on the calculated size of each extended area;
  independently encoding image data of the redefined FOV area and image data of the plurality of redefined extended areas; and transmitting separately the encoded image of the redefined FOV area and the image date of the plurality of redefined extended areas to the user device.

2. The method of claim 1, wherein the plurality of extended areas includes a first extended area adjacent to a top of the FOV area, a second extended area adjacent to a bottom of the FOV area, a third extended area adjacent to a right side of the FOV area, and a fourth extended area adjacent to a left side of the FOV area.

3. The method of claim 1, wherein the calculating comprises:
enlarging a size of an extended area corresponding to the viewing area switching direction to be larger than sizes of the other extended areas among the plurality of extended areas.

4. The method of claim 1, wherein the calculating comprises:
determining a size of an extended area corresponding to the viewing area switching direction based on the viewing area switching speed.

5. The method of claim 1, wherein the calculating comprises:
calculating a distance between the FOV area and an object to be outputted in each extended area; and
deciding a size of each extended area based on the calculated distance.

6. The method of claim 5, wherein the determining the size of each extended area comprises:
expanding a size of each extended area to include all objects when each extended area includes the objects more than a predetermined ratio.

7. The method of claim 1, wherein the user device is a head mounted display (HMD).

8. A method of providing, by a server, a virtual reality (VR) contents streaming service, the method comprising:
receiving a request message for requesting a predetermined VR contents from a user device through a communication network;
defining a field of view (FOV) area in each image frame of the predetermined VR contents and a plurality of extended areas adjacent to the FOV area;
receiving a viewing area switching request from the user device, wherein the viewing area switching request includes information on a viewing area switching direction and a viewing area switching speed;
determining a size of each extended area based on at least one of the viewing area switching direction, the viewing area switching speed, and a location of an object to be displayed in each extended area;
redefining the FOV area and the plurality of extended areas based on the determined size of each extended area;
encoding independently i) updated FOV image data of the redefined FOV area and ii) updated extended image data of the plurality of extended areas; and
transmitting separately i) the encoded and updated FOV image data and ii) the encoded and updated extended image data to a user device.

9. The method of claim 8, wherein the determining a size comprises:
determining a size of an extended area in the viewing area switching direction to be larger than sizes of the other extended areas among the plurality of extended areas.

10. The method of claim 8, wherein the determining a size comprises:
determining sizes of the extended areas differently based on at least one of the viewing area switching speed, the viewing area switching direction, and objects in each extended area.

* * * * *